(12) United States Patent
Miezeiwski et al.

(10) Patent No.: US 7,232,851 B2
(45) Date of Patent: Jun. 19, 2007

(54) LITHOGRAPHIC ENERGY CURABLE INKS

(75) Inventors: Stan Miezeiwski, Stroudsburg, PA (US); Paul Sirotto, Little Falls, NJ (US); Mikhail Laksin, Scotch Plains, NJ (US); Jean Dominique-Turgis, Rutherford, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 10/486,144

(22) PCT Filed: Aug. 7, 2002

(86) PCT No.: PCT/US02/24939

§ 371 (c)(1),
(2), (4) Date: Jun. 28, 2004

(87) PCT Pub. No.: WO03/014239

PCT Pub. Date: Feb. 20, 2003

(65) Prior Publication Data

US 2004/0235979 A1    Nov. 25, 2004

(51) Int. Cl.
*C09D 4/02*   (2006.01)
*C09D 11/10*  (2006.01)
*C09D 4/06*   (2006.01)
*C09D 193/04* (2006.01)
*C08J 3/28*   (2006.01)

(52) U.S. Cl. ............... 522/101; 522/134; 522/135; 522/141; 522/142; 522/143; 522/100; 522/150; 522/144; 522/153; 522/162; 522/165; 522/168; 522/170; 522/179; 522/182; 522/183; 106/31.13; 106/31.72; 106/31.73; 106/31.75; 106/31.76

(58) Field of Classification Search ............... 522/100, 522/101, 134, 135, 141, 142, 143, 150, 144, 522/153, 162, 165, 170, 179, 182, 183; 106/31.13, 106/31.72, 31.75, 31.73, 31.76

See application file for complete search history.

(56) References Cited

U.S. PATENT DOCUMENTS 5,354,367 A * 10/1994 Pennaz ................. 522/157

FOREIGN PATENT DOCUMENTS

EP   1104792 A1 * 6/2001

* cited by examiner

*Primary Examiner*—Sanza L. McClenodn
(74) *Attorney, Agent, or Firm*—Kramer Levin Naftalis & Frankel LLP

(57) ABSTRACT

An energy curable lithographic ink composition having an asymptotic relative viscosity of about 0.4 to about 1.5 and a water up-take number of at least about 30%. Also disclosed is a method of improving various rheological properties and increasing the water window of an energy curable lithographic ink by varying the composition of the ink in order to result in an asymptotic relative viscosity of about 0.4 to about 1.5 and a water up-take number of at least about 30%. A method of identifying and selecting an energy curable lithographic ink composition having optimal press performance is also disclosed.

24 Claims, 2 Drawing Sheets

LITHOGRAPHIC ENERGY CURABLE INKS

FIELD OF THE INVENTION

This invention relates to an energy curable lithographic inks having improved or optimal press performance properties and larger water windows, and methods for making same.

BACKGROUND OF THE INVENTION

Ultra-violet light curable (UV) and electron beam energy curable (EB) lithographic inks are well established market products in the printing ink or graphic arts market. Examples of energy curable lithographic inks are disclosed in U.S. Pat. No. 5,985,984 and U.S. Pat. No. 6,316,517, which is incorporated herein by reference. Their major benefits are good physical and, chemical resistance properties achieved immediately after curing. Instantaneous cure of UV and EB inks allows for such uses as converting of folding cartons in-line without damaging a printed image (scratches, flaking off, etc.). However, conventional UV/EB lithographic inks suffer from a number of lithographic printing deficiencies such as narrow water window, poor emulsion quality which results in toning and scumming, and a tendency to pile on the offset printing blankets due to poor ink transfer and release which causes defects in the printed image product, and adds cost to a need to change the blankets.

Conventional oil based inks are also well established market products in the lithographic printing market. However, conventional oil based inks have numerous deficiencies as well. For example, the time needed to develop the polymerization qualities of a coated conventional lithographic film is excessive.

One approach has attempted to combine the UV/EB lithographic inks with conventional oil based lithographic inks by applying UV/EB lithographic inks over conventional oil based inks. This approach has not been successful in that it typically results in a significant reduction in gloss and still requires a printed product be coated off-line after the conventional oil based ink is completely dry. Such an approach normally requires a delay of up to 72 hours for the conventional oil based inks to dry completely before the UV/EB coating can be applied off-line, a problem known as "dry back". This is due to the fact that conventional oil based inks dry via a much slower oxidation mechanism requiring multi-step drying and curing. All of this results in added print production expense and production time constraints. Thus, there is a need for a UV/EB lithographic ink that maintains good physical and chemical resistance properties immediately upon and after curing.

Unfortunately, it has always been a challenge to formulate energy curable lithographic inks using acrylate monomers and oligomers as "building blocks". A number of publications and patents have suggested the use of conventional resins such as rosin esters and alkyds in combination with acrylated monomers and oligomers to improve lithographic press performance. However, practical implementation of these ideas has not been widely demonstrated due to serious difficulties in producing stable mixtures of these materials so different in polarity and solubility. For example, UV lithographic inks have a limited water or fountain solution tolerance, which is also referred to as "water window." Water window is defined as an ink's ability to sustain print density despite having an excessive amount of emulsified water. Inks with narrow water window tend to cause many lithographic press problems such as poor ink transfer which results in low print density, toning, piling, scumming, and excessive dot gain. The, overall behavior of lithographic ink regarding these factors defines its lithographic press performance.

Even where a lithographic ink as described above is successfully produced, it does not have a long shelf life and is prone to easy separation under severe printing press shear conditions, causing piling on the rollers and blankets. The prior art does not teach how to formulate a mixture of conventional and UV/EB curable lithographic inks having optimal lithographic press performance. It also does not teach how to effectively identify lithographic inks that offer optimal press performance from, for example, laboratory experiments.

Accordingly, there is a need to provide an energy curable lithographic ink composition having a long shelf life and optimal lithographic performance, including but not limited to a wider water window while still maintaining good lithographic performance on press, such as low dot gain, effective transfer of ink, effective ink trapping, good print contrast, good ink mileage and the absence of toning, scumming, picking, piling and dry back and other properties.

SUMMARY OF THE INVENTION

The present invention provides an energy curable lithographic ink having an asymptotic relative viscosity of about 0.4 to about 1.5 and a water up-take number of at least about 30%.

This invention also provides a method of increasing the water window of an energy curable lithographic ink composition comprising varying said ink composition so as to result in an ink composition having an asymptotic relative viscosity of about 0.4 to about 1.5 and a water up-take number of at least about 30%.

This invention further provides a method of improving at least one press performance parameter selected from the group consisting of ink transfer, print contrast, dot gain, ink trapping, gloss and ink mileage for an energy curable lithographic ink composition so as to result in an ink composition having an asymptotic relative viscosity of about 0.4 to about 1.5 and a water up-take number of at least about 30%.

This invention further provides a method of identifying an energy curable lithographic ink composition having optimal press performance comprising selecting an ink composition having an asymptotic relative viscosity of about 0.4 to about 1.5 and a water up-take number of at least about 30%.

DETAILED DESCRIPTION OF THE INVENTION

Figure 1:
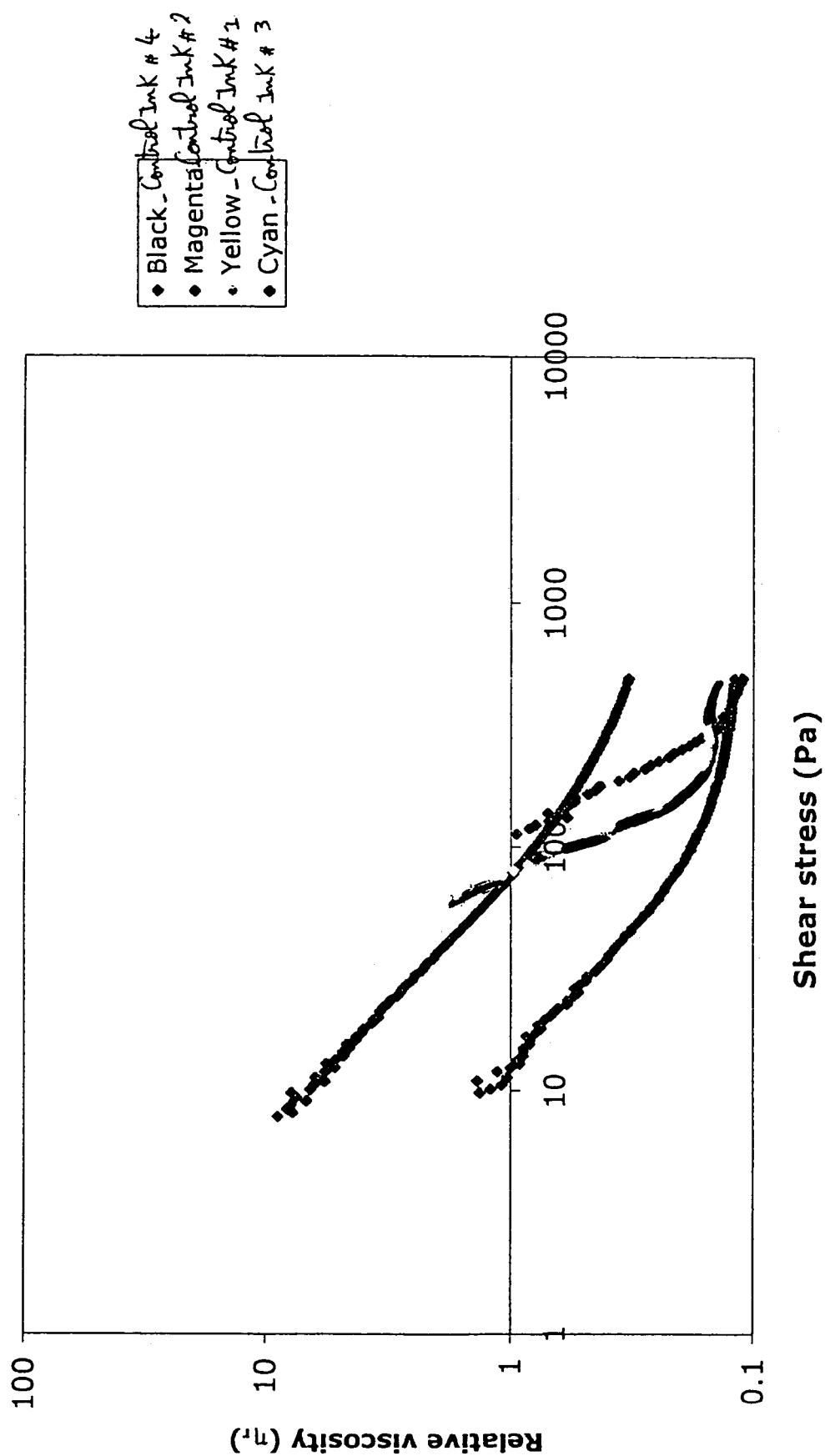
FIG. 1 shows the relationship of relative viscosity versus shear stress for four different conventional energy curable lithographic inks.

It has now surprisingly been found that the water window and performance press properties of an energy curable lithographic ink can be significantly improved by formulating said ink based on associated asymptotic relative viscosity ($\eta_r$) and water up-take WUT).

In general, the energy curable lithographic inks of the present invention are electron beam energy (EB) or ultra violet light (UV) curable inks containing rosin ester or hydrocarbon esters, natural or synthetic oils and resins, and a mixture of reactive monomers and oligomers such as acrylates including difunctional epoxy acrylate or oil modified tetrafunctional polyester acrylate. The energy curable lithographic inks of the present invention further contain alkyd and conventional resins used in non-energy curable lithographic inks such as rosin ester resins, maleic or phenolic modified rosin ester resin. Photoinitiators are further necessary for energy curable lithographic inks requiring UV curing, but they are not necessary for energy curable lithographic inks requiring EB curing.

The energy curable lithographic inks of the present invention exhibit superior lithographic performance as defined above, regardless of the exact percentages of the components of the composition. For instance, such inks exhibit a wide water window and far superior lithographic press performance while offering rapid polymerization under UV or EB irradiation. The largest use improvement of the inks of the present invention lies in the ease of establishing and maintaining operational press settings without continual modification during the press run.

In establishing the criteria of the rheological performance of the inks of the present invention, 10 parts of the ink is emulsified with 1 part of water or any commercially available fountain solution on the proper mixing equipment. Both neat and emulsified inks are then subjected to a wide range of shear stress (flow experiment), typically from 0.01 to 10000 Pa using a rheometer. The geometry used to record viscosity profiles is not restricted in any way. The measurements were obtained using a cone-and-plate setting. As indicated above, the viscosity ratio between emulsified and neat inks ($\eta_r = \eta_{emulsified}/\eta_{neat}$) called asymptotic relative viscosity of an energy curable lithographic ink should be between 0.4 and 1.5. The best performing energy curable lithographic inks should have a $\eta_r$ between 0.7 and 1.1, and more preferably between 0.9 and 1.1. In order to optimize the lithographic press performance of the inks of the present invention, the $\eta_r$ is recorded and if outside of the above range, components of the inks are modified so as to achieve the range.

The viscosity ratio is best obtained by extrapolation at infinite shear stress, but is typically valid above 1000 Pa of stress or a stress 10 times higher that the yield stress of the emulsified ink.

Additionally, the inks of the present invention exhibit a high water up-take (WUT) which represents water capacity of the given ink and is determined by mixing together 100 g of ink with 100 ml of water or fountain solution until no more water is emulsified by the ink. The percent of water (volume by weight) incorporated into the ink is recorded as a WUT percentage. It has been determined that the WUT percentage should not be lower than 30%, and can be as high as 80%, in order to achieve superior performance on press.

In order to achieve superior press performance, the inks of the present invention are formulated such that both the $\eta_r$ ratio and WUT percentage are within the above ranges and thus the components of the inks of the present invention may require modification in order to achieve said ranges. Failure to meet both the $\eta_r$ of between about 0.4 to about 1.1 and the WUT of at least 30% leads to a number of lithographic printing complications, including poor ink transfer, toning, piling, scumming and other printing problems.

Ink Performance Properties

It has been found that certain lithographic press performance properties must be maintained by a UV/EB lithographic ink, in order for it to effectively print. For example, in optimal lithographic printing the water window should be wide, dot gain should be low, print density should be high, ink transfer and trapping should be good, print contrast should be good, there should be no piling or picking, the emulsion quality must be high enough so as to avoid toning and scumming, mileage of the ink should be high, and the frequent need for blanket wash should be low.

"Dot gain" is defined as an increase in dot size as a result of transferring image from the printing plate on the substrate. "Trapping" is defined as the overlap of one printing ink over a-previously printed ink. "Picking" is defined as the pulling of tiny pieces of the paper substrate by an ink with too high a tack. "Piling" is defined as the build up of ink on the offset blanket. "Toning" is defined as the contamination of the non-image area of the print with ink. "Scumming" is defined as the contamination of fountain solution with ink particles. "Ink mileage" is defined as the number of prints that can be produced with the same amount of ink. The frequency between the need for blanket washes is measured by the number of impressions between said required blanket washes, where the washes are required due to dried ink on the press blanket. The frequency of blanket washes should optimally be low while the number of impressions between blanket washes should be high.

It has been found that the press performance of an energy curable lithographic ink can be predicted and thus the press performance controlled based on the inks asymptotic relative viscosity and WUT.

Rheology Criteria

Ink having the lithographic press performance properties described above preferably should have an optimal asymptotic relative viscosity. The energy curable lithographic ink of the present invention is produced by first emulsifying 10 parts of distilled water or fountain solution in 100 parts of ink by high-speed mixing using Cowles blades at 1000 rpm at room temperature for one minute. This amount is not restrictive and the same results may be obtained at any water level in the emulsified ink between 5% and the maximum the ink can take up, determined by the water up-take test. Minimal heating is noticed during the emulsification step.

Viscosities are recorded on a stress-controlled rheometer, model AR1000 from TA Instruments using a 2 cm 0.5° cone. The stress is ramped in the interval 0.01–10000 Pa and viscosity is recorded versus stress. For each stress value, the relative viscosity $\eta_r$ is calculated by dividing the viscosity of the emulsified ink by the viscosity of the neat ink.

Figure 2:
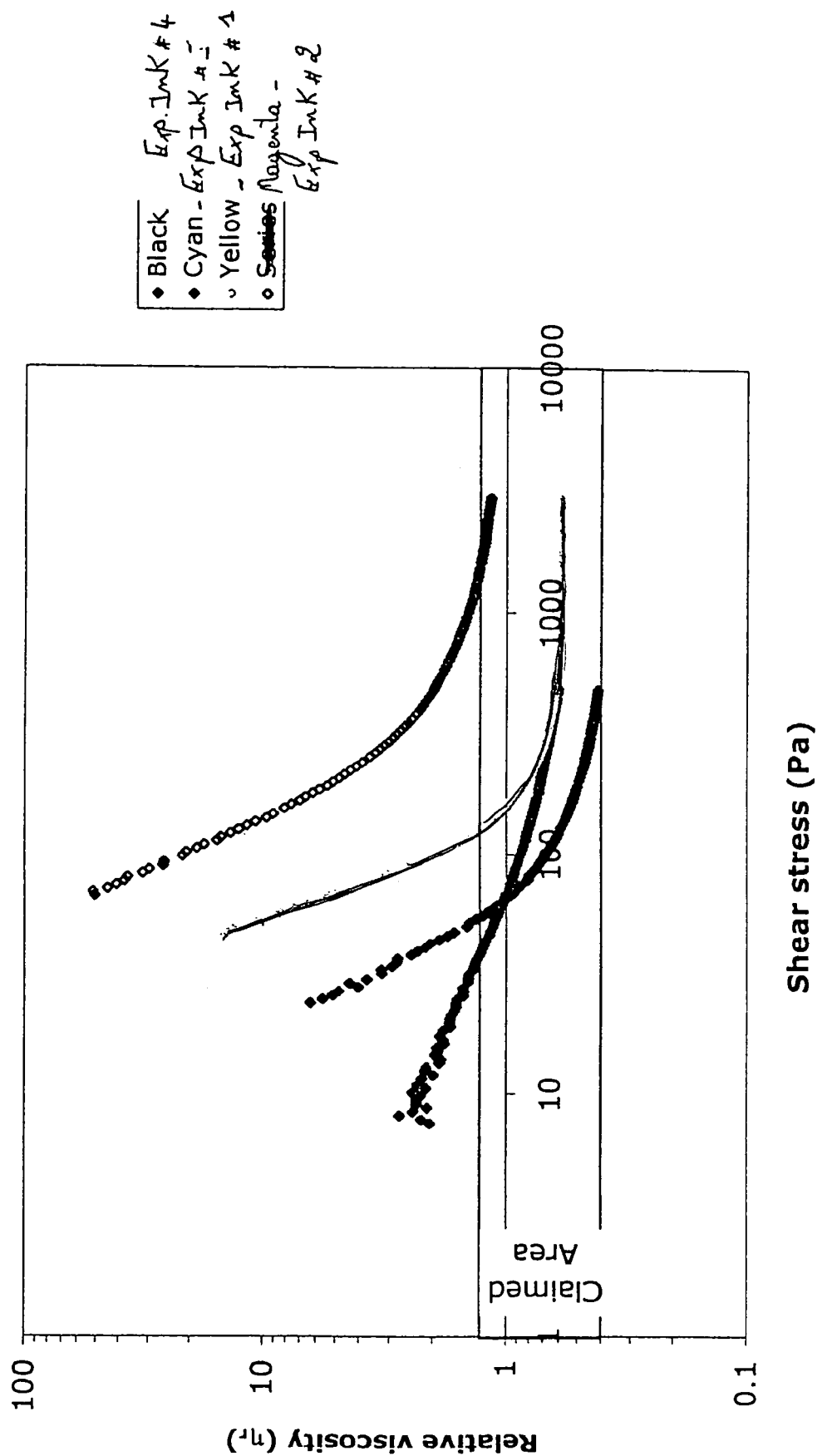
FIG. 2 shows the relationship of relative viscosity versus shear stress for four different energy curable lithographic inks of the present invention.

FIG. 1 shows typical curves for conventional inks and FIG. 2 shows typical curves for the inks of the present invention (see description of inks below) obtained using this test. The curve of the inks of the present invention always tend to have an asymptotic value at sufficiently high stress. The global shape of the curve may vary depending on the interactions taking place in the sample between all phases present. Accurate calculation of the relative viscosity requires that a large enough portion of the curve be recorded at high stress. Typically, this is true above 1000 Pa.

Any method-using shear can be-used to obtain the asymptotic value of the viscosity including but not limited to capillary viscometers, cone-and-plate, concentric cylinder on any type of viscometer or rheometer (stress- and rate-controlled), and others presently known in the art.

Water Window

Inks having the optimal lithographic press performance properties described above should have a water window of at least 30%. The water window of inks of the present invention are determined on a two color sheet-fed Miehle press by first supplying the minimum amount of water (fountain solution) required to clean up a non-image area of the lithographic plate and achieve target print density (typically 1.00 for yellow, 1.35 for red, 1.4 for blue and 1.65 for black). Once density is achieved, additional water is supplied gradually by opening water control keys in the fountain solution unit. After each incremental increase in water supply is completed, about 200 sheets are printed and print density is measured. This increase of water supply continues until print density drops significantly, at least 0.1 in print density (5–10%). The spread between initial and final water key settings represents water window or the range of water tolerance of the tested ink.

The following examples illustrate the invention. The examples use multiple colors (yellow, magenta, cyan, black and a blended blue) of the inks of the present invention and of comparison examples to show the optimal performance properties maintained by the ink of the present invention having a WUT and rheological criteria of the present invention.

EXAMPLE 1

UV or EB curable inks of the present invention were prepared by mixing a pigment with liquid mixture of resins, oligomers monomers, photoinitiators in case of UV curing (no photoinitiator for EB curable inks). Each ink composition was then ground on 3 roll mill until proper pigment particle size distribution was achieved. After grinding was completed, the ink was ready for printing.

Table 1 below shows the composition of energy curable lithographic inks (Example 1A–1D Inks) that meet the WUT and $h_r$ criteria simultaneously. The difference between the four example inks is only the type of pigment added to each ink composition.

TABLE 1

| Materials | Example 1-A (Yellow) | Example 1-B (Magenta) | Example 1-C (Black) | Example 1-D (Cyan) |
|---|---|---|---|---|
| Inhibitor | 2.0 | 2.0 | 2.0 | 2.0 |
| Hard Resin (Rosin or hydrocarbon in Monomer DITMPTA) | 22.0 | 22.0 | 22.0 | 24.0 |
| Oligomer (tetrafunctional polyester acrylate) | 17.0 | 17.0 | 16.0 | 18.0 |
| Oligomer (difunctional epoxy acrylate) | 7.0 | 14.0 | 12.0 | 13.0 |
| Monomer (DITMPTA, TMPTA) | 29.5 | 17.5 | 14.5 | 14.5 |
| Alkyd | 5.0 | 5.0 | 5.0 | 5.0 |
| Photoinitiator | 3.0 | 4.0 | 7.0 | 4.0 |
| Talc | 3.0 | 3.0 | 2.0 | 3.0 |
| Wax | 0.5 | 0.5 | 0.5 | 0.5 |
| Pigment | 11.0 | 15.0 | 19.0 | 16.0 |
|  | 100.0 | 100.0 | 100.0 | 100.0 |

COMPARATIVE EXAMPLE 2

Conventional energy curable lithographic inks (Conventional Inks 2A–2D) were prepared by mixing a pigment with liquid mixture of resins, oligomers monomers, photoinitiators in case of UV curing (no photoinitiator for EB curable inks). Each ink composition was then ground on 3 roll mill until proper pigment to particle size distribution was achieved. After grinding was completed, the ink was ready for printing.

Table 2 below shows the composition of conventional energy curable lithographic inks that do not meet the WUT and $h_r$ criteria simultaneously. The difference between the four conventional inks is only the type of pigment added to each ink composition.

TABLE 2

| Materials | Conven. 2-A (Yellow) | Conven. 2-B (Magenta) | Conven. 2-C (Black) | Conven. 2-D (Cyan) |
|---|---|---|---|---|
| Inhibitor | 1.0 | 1.0 | 2.0 | 1.0 |
| Hard Resin (Polyurethane Urea as described in U.S. Pat. No. 5,985,984) in monomer | — | — | 20.4 | — |
| Difunctional epoxy acrylate (oil modified) | 23.6 | 16.0 | 24.5 | 24.8 |
| Tetrafunctional polyester | 8.3 | 10.2 | 10.2 | — |
| Flush color (hard resin solution, oil modified epoxy acrylate, monomer and pigment) described in U.S. Pat. No. 5,985,989 | 54.7 | 62.1 | — | 54.7 |
| Photoinitiator | 6.8 | 7.1 | 10.2 | 7.0 |
| Wax | 1.0 | 1.0 | 1.0 | 1.0 |
| Talc | 3.6 | 2.6 | 3.0 | 3.0 |
| Fumed Silica | 1.0 | — | 1.0 | 2.0 |
| Monomer (TPGDA, E-TMPTA, GPTA) | — | — | 9.4 | 6.5 |
| Pigment | — | — | 18.3 | — |
|  | 100.0 | 100.0 | 100.0 | 100.0 |

EXAMPLE 3

The Example 1A–1D Inks and Conventional 2A–2D Inks were tested for WUT and-viscosity ratio (at infinite stress) with the following results.

TABLE 3

| Ink | WUT | $\eta_r$ |
|---|---|---|
| Example 1-A (Yellow Pigment) | 30 | 0.63 |
| Conventional 2-A (Yellow Pigment) | 26 | 0.16 |
| Example 1-B (Magenta Pigment) | 40 | 1.10 |
| Conventional 2-B (Magenta Pigment) | 40 | 0.21 |
| Example 1-C (Black Pigment) | 36 | 0.45 |
| Conventional 2-C (Black Pigment) | 26 | 0.11 |
| Example 1-D (Cyan Pigment) | 38 | 0.51 |
| Conventional 2-D (Cyan Pigment) | 28 | 0.12 |

As indicated in Table 3 above, the conventional ink compositions do not meet requirements for both criteria simultaneously, while the Example 1A–1D Inks show very high water acceptance combined with minimal reduction in viscosity. Batch-to-batch variations may affect these numbers by about 10%.

EXAMPLE 4

Example 1A–1D Inks, having the water up-take and $\eta_r$ ranges described above, were tested for lithographic printing properties. The inks were applied onto a paper board substrate via a Hamilton press and average measurements for density (measured by a Densitometer) and dot gain were observed over a period of several hours. The following average results for this time period are set forth in Table 4 below:

TABLE 4

|  | Example 1-A (Yellow) | Example 1-B (Magenta) | Example 1-C (Cyan) | Example 1-D (Black) |
| --- | --- | --- | --- | --- |
| Density | .96 | 1.37 | 1.44 | 1.7 |
| Dot gain | 13% | 21% | 16% | 13% |

Example 1A–1D Inks exhibited good lithographic printing qualities. The dot gain was low and density was near target for each pigment.

EXAMPLE 5

Using Example 1A–1C inks and Conventional 2A–2C Inks, a test was performed to measure performance attributes in the increase of print mileage as indicated by the cut of ink keys and overall water balance based on ability of the inks to print with reduced amount of water. The control inks and experimental inks were applied onto a paper board. The results are set forth below.

TABLE 5

| Ink | Cut of ink keys | Water Motor Speed | Scumming Density |
| --- | --- | --- | --- |
| Example 1-A (Yellow Pigment) | 8 | 12 | 0.02 |
| Conventional 2-A (Yellow Pigment) | — | 20 | 0.078 |
| Example 1-B (Magenta Pigment) | 4 | 12 | 0.07 |
| Conventional 2-B (Magenta Pigment) | — | 24 | 0.057 |
| Example 1-C (Black Pigment) | 20 | 40 | 0.02 |
| Conventional 2-C (Black Pigment) | — | 48 | 0.065 |

Example 1A–1C Inks had a better water balance which led to reduced scumming. Example 1A–1C Inks were observed to have a dramatic decrease in scumming (over 90%). Thus, the inks of the present invention having a WUT of at least 30% and $\eta_r$ of between about 0.4 to about 1.5 had better lithographic printing qualities, as set-forth in Table 6 below.

TABLE 6

| Ink | Reduction in Water Speed | Reduction in Scumming |
| --- | --- | --- |
| Example 1-A (Yellow Pigment) versus Conventional 2-A (Yellow Pigment) | 40% | 91% |
| Example 1-B (Magenta Pigment) versus Conventional 2-B (Magenta Pigment) | 33% | 96% |
| Example 1-C (Black Pigment) versus Conventional 2-C (Black Pigment) | 17% | 97% |

EXAMPLE 6

Using the method as set forth in Example 1, an energy curable ink having a WUT of at least 30% and $\eta_r$ of between about 0.4 to about 1.5 was produced with the following components):

TABLE 7

| | |
| --- | --- |
| Inhibitor | 2.0 |
| Hard Resin (Rosin or hydrocarbon in Monomer DITMPTA) | 16.0 |
| Oligomer (tetrafunctional polyester acrylate) | 21.0 |
| Oligomer (difunctional epoxy) | 8.0 |
| Monomer (DITMPTA, TMPTA) | 24.7 |
| Alkyd | 5.0 |
| Photoinitiator | 4.0 |
| Talc | 3.0 |
| Wax | .5 |
| Pigment (Red) | 15.8 |
| | 100.0 |

The energy curable ink (Example 6 Ink) was then tested on a paper board substrate applied via a 8 unit Hamilton off-line press with water based coating station and interstation UV lamps. Compared to a conventional energy curable ink (SunCure 2000® UV lithographic offset ink manufactured by Sun Chemical, Inc., Ft. Lee, N.J. and outside of the range of WUT of at least 30% and $\eta_r$ of between about 0.4 to about 1.5 and referred to as "Conventional Ink of Example 6"), Example 6 Ink had a water setting which was reduced 30 points (from 50 with the standard to 20 with Example 6 Ink). Further, the density of Example, 6 Ink was on target at 1.46. In addition, Example 6 Ink trapped better (red over yellow) than the conventional ink in that visually it had more uniform coverage of the red over yellow.

EXAMPLE 7

The same inks from Example 6 were then tested for lithographic properties of mileage and average density. Both inks were separately loaded into empty Hamilton web off-set presses and the amount of paper board cartons and pounds of ink used to produced said cartons over a period of about five hours were recorded. The following results are set forth below:

TABLE 8

| | Example 6 | Conventional Ink from Example 6 |
| --- | --- | --- |
| Number of cartons produced | 109,800 | 145,200 |
| Pounds of ink used | 23.5 | 34 |
| Cartons per pound of ink | 4,672.34 | 4,270.58 |

TABLE 8-continued

|  | Example 6 | Conventional Ink from Example 6 |
|---|---|---|
| Average density* | 154 | 133 |
| Ink versus water ratio** | 45/40 | 49/42 |

*Average density was compiled of 5 samplings throughout each run.
**Ink/Water speeds were taken at the end of each mileage check.

Example 6 Ink had a higher viscosity than that of Conventional Ink 6. Example 6 Ink was observed to have a 6% increase in mileage versus the control ink, which would be equivalent to 11% increase based on the 14% higher density of Example 6 Ink.

EXAMPLE 8

The same inks from Example 6 were then tested for lithographic properties of water settings, print density and dot gain. Both inks were separately loaded into empty Hamilton presses and measurements for water settings, print density (measure by a Densitometer) and dot gain were observed over a period of a few hours. The following average results for this time period are set forth in Table 9 below:

TABLE 9

|  | Example 6 | Conventional Ink from Example 6 |
|---|---|---|
| Water settings | 20 | 50 |
| Print density | 1.46 | 1.28 |
| Dot gain | 23 | 25 |

Example 6 Ink had a lower water setting and therefore printed scum free with a lower amount of fountain solution as compared with Conventional Ink from Example 6. Example 6 Ink had a higher dot gain (about 10%) while also maintaining a higher print density.

EXAMPLE 9

Using the method as set forth in Example 1, an energy curable ink within the range of WUT of at least 30% and $\eta_r$ of between about 0.4 to about 1.5 was produced with the following components:

TABLE 10

| Inhibitor | 2.0 |
|---|---|
| Hard Resin (Rosin or hydrocarbon in Monomer DITMPTA) | 14.0 |
| Oligomer (tetrafunctional polyester acrylate) | 20.6 |
| Oligomer (difunctional epoxy) | 7.5 |
| Monomer (DITMPTA, TMPTA) | 29.2 |
| Alkyd | 4.7 |
| Photoinitiator | 3.7 |
| Talc | 2.3 |
| Wax | .5 |
| Pigment (Red) | 15.0 |
| Clay | .5 |
|  | 100.0 |

Compared to a conventional energy curable ink (SunCure 2000® —Conventional Ink 6 from Example 6), Example 9 Ink had lower tack without causing any scumming problems. Example 9 Ink was tested on a paper board substrate applied via a Planeta UV Sheetfed Press and it was observed that compared to a standard maximum 2,000 of sheets between blanket washes, Example 9 Ink went a maximum of 8,000 sheets to 20,000 sheets between blanket washes. Example 9 Ink was observed to have a stable viscosity and less scumming, in addition to better press stability.

EXAMPLE 10

Using the method as set forth in Example 1, an energy curable blended blue ink, having a WUT of at least 30% and $\eta_r$ of between about 0.4 to about 1.5, was produced by combining FLK5481618 (an energy curable lithographic ink of the present invention manufactured by Sun Chemical, Inc. of Ft. Lee, N.J.) in an amount of 57% of the total ink, FLK6481619 (an energy curable lithographic ink of the present invention manufactured by Sun Chemical, Inc. of Ft. Lee, N.J.) in an amount of 32.5% of the total ink and FLKSV9481621 (an energy curable lithographic ink of the present invention manufactured by Sun Chemical, Inc. of Ft, Lee, N.J.) in an amount of 1% of the total ink'and Dimptaq, a monomer (manufactured by both Sartomer, Inc. and Hognis, Inc.). The ink was then compared to a conventional energy curable ink (SunCure 2000® —Conventional Ink from Example 6) by applying both inks on a paper board substrate using a Planeta UV Sheetfed Press. The results of the test are set forth in Table 11 below:

TABLE 11

|  | Example 10 | Conventional Ink from Example 6 |
|---|---|---|
| Tack at 1200 rpm | 13 | 10 |
| Dot gain | 23% | 39% |

It was observed that the Example 10 ink had a better original viscosity, higher tack without picking, and achieved good dot gain. In comparison, the conventional ink from Example 6 had a lower tack so as to eliminate picking which developed and in turn had an unacceptably high dot gain.

The foregoing examples are not intended to be limiting. Other examples and applications will be apparent to persons of skill in the art. The invention has also been described in terms of preferred embodiments, thereof, but is more broadly applicable as will be understood by those skilled in the art. The scope of the invention is established, by the following set of claims.

What is claimed is:

1. An energy curable lithographic ink composition comprising at least one non-radiation curable rosin ester resin, and having an asymptotic relative viscosity of about 0.4 to about 1.5 and a water up-take number of at least about 30%, wherein said rosin ester resin is selected from the group consisting of maleic modified rosin ester resin, phenolic modified rosin ester resin, or combination thereof.

2. The energy curable lithographic ink composition of claim 1, wherein said asymptotic relative viscosity is about 0.9 to about 1.1.

3. The energy curable lithographic ink composition of claim 1, wherein said asymptotic relative viscosity is about 0.7 to 1.1.

4. The energy curable lithographic ink composition of claim 1, wherein said water up-take number is at least about 40%.

5. The energy curable lithographic ink composition of claim 1, wherein said water up-take number is at least about 35%.

6. The energy curable lithographic ink composition of claim 1 curable by electron beam energy.

7. The energy curable lithographic ink composition of claim 1 curable by ultra-violet light.

8. The energy curable lithographic ink composition of claim 1 curable by a combination of electron beam energy and ultra-violet light.

9. The energy curable lithographic ink composition of claim 1 further comprising an acrylate.

10. The energy curable lithographic ink composition of claim 9, wherein said acrylate is selected from the group consisting of difunctional epoxy acrylate, oil modified tetrafunctional polyester acrylate, or combination thereof.

11. The energy curable lithographic ink composition of claim 1, further comprising an alkyd.

12. A method of obtaining an energy curable lithographic ink composition with an increased water window comprising varying the formulation of said ink composition by adding an alkyd and/or a rosin ester resin to the composition to result in the ink composition having an asymptotic relative viscosity of about 0.4 to about 1.5 and a water up-take number of at least about 30%, so as to obtain an ink composition with an increased water window.

13. The method of claim 12, wherein said rosin ester is selected from the group consisting of maleic modified rosin ester resin, phenolic modified rosin ester resin, or combination thereof.

14. The method of claim 12, wherein said asymptotic relative viscosity is about 0.9 to about 1.1.

15. The method of claim 12, wherein said asymptotic relative viscosity is about 0.7 to about 1.1.

16. The method of claim 12, wherein said water up-take number is at least about 40%.

17. The method of claim 12, wherein said water up-take number is at least about 35%.

18. The method of claim 12, wherein said energy curable lithographic ink is curable by electron beam energy.

19. The method of claim 12, wherein said energy curable lithographic ink is curable by ultra-violet light.

20. The method of claim 12, wherein said energy curable lithographic ink is curable by a combination of electron beam energy and ultra-violet light.

21. A method of obtaining an energy curable lithographic ink composition with at least one press performance parameter selected from the group consisting of ink transfer, print contrast, dot gain, ink trapping, gloss and ink mileage improved, comprising varying the formulation of said ink composition by adding an alkyd and/or a rosin ester resin to the composition to result in the ink composition having an asymptotic relative viscosity of about 0.4 to about 1.5 and a water up-take number of at least about 30%, so as to obtain an ink composition having at least one press performance parameter selected from the group consisting of ink transfer, print contrast, dot gain, ink trapping, gloss and ink mileage, improved.

22. A method of identifying an energy curable lithographic ink having optimal press performance comprising selecting an ink having an asymptotic relative viscosity and a water up-take number.

23. The method of claim 22 wherein said asymptotic relative viscosity is between about 0.4 to about 1.5.

24. The method of claim 22 wherein said water up-take number is about 30%.

* * * * *